United States Patent [19]

Mizuochi

[11] 4,029,889

[45] June 14, 1977

[54] FLUID-LEAK DETECTOR CABLE

[75] Inventor: Shoken Mizuochi, Niigata, Japan

[73] Assignee: Asahi Engineering & Construction Co., Ltd., Tokyo, Japan

[22] Filed: Apr. 4, 1975

[21] Appl. No.: 565,221

[30] Foreign Application Priority Data

Oct. 8, 1974 Japan .......................... 49-115944

[52] U.S. Cl. .............................. 174/11 R; 174/107; 174/110 FC; 174/115; 324/52; 340/242

[51] Int. Cl.² .......................................... H01B 7/32

[58] Field of Search .............. 340/242, 416, 248 P, 340/248 N, 235; 324/52, 53, 66, 67; 174/11 R, 115, 107, 110 F, 110 FC, 102 R; 200/61.04 X

[56] References Cited

UNITED STATES PATENTS

| 3,281,674 | 10/1966 | Landgraf | 324/52 |
|---|---|---|---|
| 3,510,762 | 5/1970 | Leslie | 324/52 |
| 3,553,341 | 1/1971 | Hureau | 174/115 X |
| 3,564,526 | 2/1971 | Butts | 200/61.04 |
| 3,600,674 | 8/1971 | Roberts | 174/11 R X |
| 3,727,128 | 4/1973 | McFerrin | 324/52 |
| 3,800,217 | 3/1974 | Lowrance | 324/52 X |

FOREIGN PATENTS OR APPLICATIONS 46-7902 2/1971 Japan .......................... 20/61.04

Primary Examiner—Arthur T. Grimley
Attorney, Agent, or Firm—Birch, Stewart, Kolasch and Birch

[57] ABSTRACT

A cable for detecting, in a stable and waterproof way, any leak of petroleum, petroleum product, or other fluid from an underground pipeline by means of a change in the electrostatic capacity between inner and outer conductors of the cable due to permeation by the leaking fluid. The cable offers constant, uninterrupted monitoring of such a pipeline with no limit to the watching range, and can accurately locate even a minor leak. The invention also involves a method of installing a detection system using such a detector cable, and a detection method which depends on electric pulses as means for detecting such a leak.

12 Claims, 8 Drawing Figures

FLUID-LEAK DETECTOR CABLE

The present invention relates to a fluid-leak detector cable for detecting any leak of petroleum, petroleum product or other fluid from an underground pipeline by taking advantage of a change in the electrostatic capacity between inner and outer conductors of the cable due to permeation by the leaking fluid, with stabilized detection performance and watertightness and further with the capability of continuous monitoring over a limitless range for the detection of even a minor leak. The present invention also concerns a method of installing a fluid-leak detection system using the above-said cable and to a detection method which utilizes electric pulses for the detection of leaking fluid.

BACKGROUND OF THE INVENTION

A recent trend is toward the laying of more and more underground pipelines for the transportation of petroleum and petroleum products in locations where they are handled. For such underground installations a Japanese Ministerial ordinance "Oil products pipeline business law" enacted in 1972 makes it an obligation to provide a leak detector which would promptly detect any leak from any piping.

Prior art detection methods include:
1. Flow difference system
2. Pressure grade pilot system
3. Differential pressure pilot system
4. Acoustic sound detection system
5. Gas or perfume detection system
6. Special underground cable system These known systems have a number of drawbacks. The systems (1) and (2) fail to detect minor leaks exactly, systems (3) and (4) are not adapted for continuous monitoring, and system (5) demands an unduly large number of detection instruments when applied to long-distance pipelines. The last-mentioned system (6), disclosed in my copending patent applications (Japanese Pat. Appln. Nos. 19898/73 and 57960/73), comprises laying a special cable composed of two electric conductors covered by an oil-soluble insulation in parallel with a pipeline so that, in case of an oil leak, the leaking fluid passes into the cable and dissolves the insulation to lower the electric resistance between the conductors and thereby make the leak known. This system functions rather instably, however, because the leaking oil itself is an insulating material and its presence can in some cases prevent the drop of inter-conductor resistance or short-circuiting between the conductors despite the dissolution of the oil-soluble insulation. In addition, the use of a more readily soluble insulation as the wrapping for the conductors can shorten the cable life to an impractical extent. Conversely, if a less soluble insulation is employed for added durability, it will take so much time for dissolution as to make quick detection difficult.

BRIEF SUMMARY OF THE INVENTION

Of the conventional fluid-leak detection methods above enumerated, the system (6) forms the basis of the present invention, and the invention aims at circumventing the aformentioned shortcomings of the system (6).

It is thus an object of the present invention to provide a fluid-leak detection system through a change in the electrostatic capacity between the conductors of a fluid-leak detection cable with the permeation of the cable with petroleum, petroleum product, or other fluid.

Another object of the present invention is to provide a fluid-leak detector cable wherein the space between inner and outer conductors and the exterior of the outer conductor are insulated by a permeable plastic material which is water-resistant but permeable to oil products.

Yet another object of the present invention is to provide a method of laying a fluid-leak detector cable closely along an underground fluid-conducting pipeline connecting a fluid storage tank with a receiving tank in such a manner as to enable any leaking fluid to permeate the nearby part of the cable.

A further object of the present invention is to provide a fluid-leak detection system which comprises sending out an electric pulse into a fluid-leak detector cable from one end thereof, and observing either the reflected wave of the pulse at the transmitting end or the arriving wave of the pulse at the other end of the cable to detect any leak.

According to the present invention, an industrially very advantageous fluid-leak detector cable is provided which is more stable in detection performance than the conventional cables and is resistant to water, capable of continuous monitoring without limitation to the range, sensitive to even a minor leak, and requires relatively low initial investment and maintenance cost.

BRIEF DESCRIPTION OF THE DRAWINGS

The present invention will be described in more detail hereunder with reference to the accompanying drawings showing embodiments thereof wherein.

DETAILED DESCRIPTION

Figure 1:
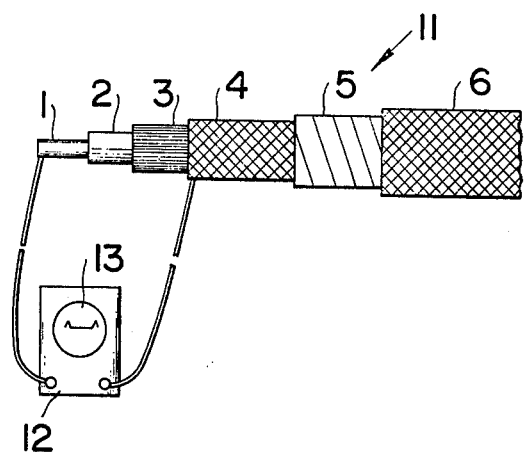
FIG. 1 is a fragmentary view of a fluid-leak detector cable embodying the invention, partly cut away to show the internal structure.

Referring now to FIG. 1, wherein the invention is embodied in a cable of coaxial construction, the numeral 1 indicates an electrically conductive inner conductor made, for example, of copper or aluminum. The numeral 2 is electrical insulation made of polyethylene or Teflon (polytetrafluoroethylene), for example, and element 3 is a serving layer for retaining petroleum or other leaking fluid that has permeated the cable. The serving layer 3 is covered by a layer consisting of soft copper wires braided in a netlike structure which constitutes an outer conductor 4. This conductor permits penetration of the leaking fluid into the cable and also serves as a shield against the induction from the external electric field. The outer conductor 4, in turn, is covered by an anti-corrosive wrap 5 which allows only the leaking fluid such as petroleum to pass therethrough while keeping out the ground water. Where the fluid the leak of which is to be detected is petroleum, the anti-corrosive wrap 5 is a fibrous tape impregnated with an oil-soluble anti-rust material, e.g., asphalt or petrolatum, which is resistant to water and chemicals, the tape being spirally wrapped around the outer conductor. Alternatively, the wrap 5 may be a copper or iron tape coiled around the conductor, or may take the form of a permeable plastic film specially treated to be highly water-repellent and permeable to petroleum only. For example, it may be a porous permeable film of PTFE (Teflon) expanded to an open-cell structure having an average pore size of 0.5 – 5.0 microns and a porosity of 85 – 95%. As a further alternative, a suitably perforated iron pipe may be used under certain conditions of installation. The anti-corrosive wrap 5 is protected by an outermost covering 6 or sheath of metal wires or synthetic fiber netting.

Figure 2:
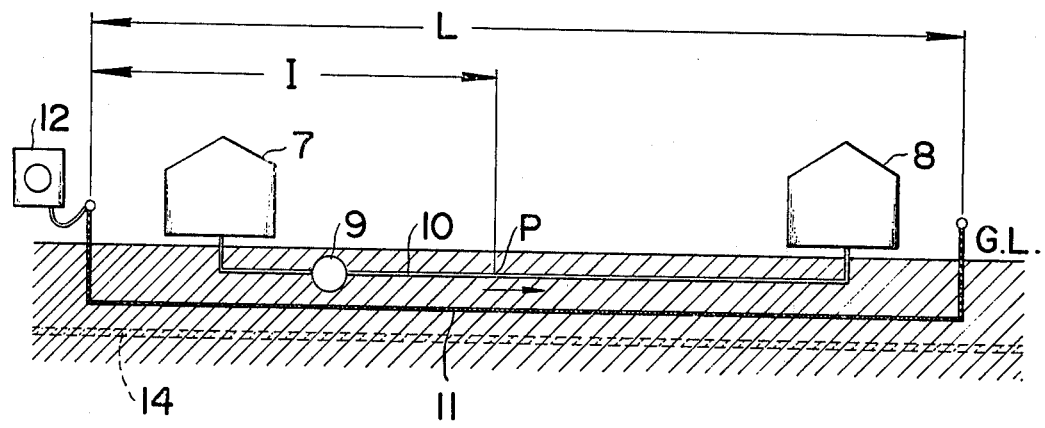
FIG. 2 is a schematic view of a typical installation wherein the fluid-leak detector cable of the present invention is laid underground.

In FIG. 2, there are shown a storage tank 7 from which the fluid is delivered to a receiving tank 8, a pump 9 for forcing the fluid to the receiving tank, and a pipeline 10 through which the fluid is transported. In accordance with the present invention, the fluid-leak detector cable 11 of the construction above described usually is laid underground between the tanks 7 and 8 and along the pipeline 10 in close proximity thereto, say within 100 mm from the overlying line, so that any leak of the fluid can promptly be detected. Where necessary, a barrier floor 14 for avoiding the spread of leaking fluid may be laid beneath the pipeline 10 and the cable 11. A cable monitor 12, for example, of the pulse reflection type, is connected between the inner conductor 1 and the outer conductor 4 of the cable. From this monitor 12 is sent out an electric pulse into the inner conductor 1, and the reflected wave of the pulse is displayed on a cathode-ray tube 13 of the monitor 12.

OPERATION

Figure 3:
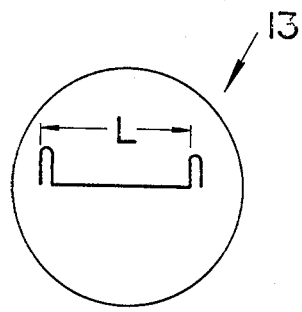
FIG. 3 is a waveform on the screen of a cathode-ray tube included in the fluid-leak detection system of the present invention, indicating that there is no irregularity in the cable.

The operation of the present invention will now be explained. As long as the pipeline 10 is sound and the fluid is being transported from the storage tank 7 to the receiving tank 8 through the line, each electric pulse transmitted by the monitor 12 is reflected by the opposite end of the inner conductor 1 and comes back to the starting end. The cathode-ray tube 13 displays the echo, with peaks at the starting and finishing ends as shown in FIG. 3. This means that there is no irregularity throughout the overall length L of the pipe-line 10.

Figure 4:
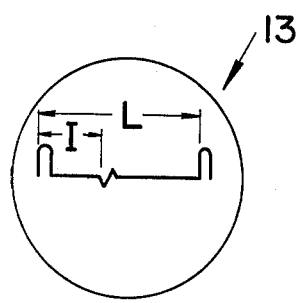
FIG. 4 is a waveform indicating a change in the electrostatic capacity of the cable.
Figure 5:
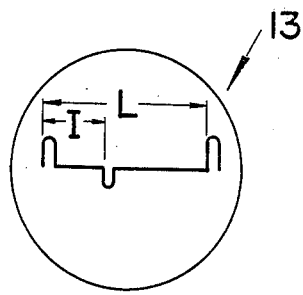
FIG. 5 is a waveform indicating a short-circuit made in the cable.

If the fluid leaks at the point P of the pipeline, the fluid will dissolve the asphalt or petrolatum with which the anti-corrosive wrap 5 is impregnated or will pass through the permeable plastic film and thence through the outer conductor 4 into the serving 3, as the case may be. This will bring a localized change in the electrostatic capacity between the inner conductor 1 and the outer conductor 4 of the cable. Then, electric pulses are transmitted from the monitor 12 into the inner conductor 1. Each pulse is partially reflected by the leaking point because of its changed capacity. As a result, the leak is displayed on the cathode-ray tube 13, as in FIG. 4, with a waveform having a cycle of small peaks, first on a minus side, indicating the leaking point and the range or the distance I between the instrument and the target point. If any dielectric breakdown takes place in the insulation 2, the inner conductor 1 and the outer conductor 4 will make a short circuit, giving a minus peak in the waveform on the cathode-ray tube as in FIG. 5.

Figure 6:
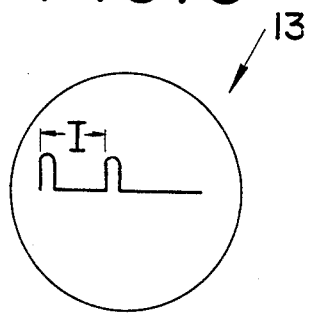
FIG. 6 is a waveform indicating a broken conductor in the cable.

FIG. 6 shows the cathode-ray tube presentation of a break in the inner conductor 1 at the point P, with a plus peak.

Figure 7:
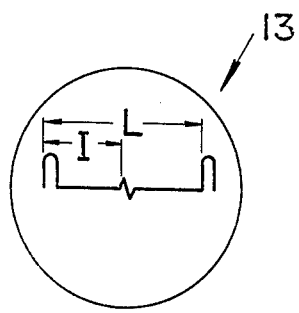
FIG. 7 is a waveform indicating an inductance problem in the cable.

FIG. 7 shows a change in the inductance at the same point, in which case a cycle of small notches, first on the plus side, appears.

When the electric insulation 2 is about to undergo dielectric breakdown, it is possible to send out electric pulses of gradually increased voltages, in succession, from one end of the cable and visually observe the transition phenomena of dielectric breakdown throught the screen of a cathode-ray tube or the like at the other end of the cable. In this manner an effect similar to that derivable from the use of the monitor 12 can be achieved. Further, the analog representation so far described in connection with the invention may be supplanted by a digital one, so that the range up to the failure point may be displayed on a counter.

The present invention is reduced to practice in the way described hereinabove. Proper care must be used, however, in selecting the serving 3 because, when the leaking fluid merely permeate the space between the inner and outer conductors of the cable, the change in the electrostatic capacity between the conductors, that is, the change in the characteristic impedance, will be less than when the conductors are short-circuited or when either conductor is broken. To be more exact, where the fluid the leak of which is to be detected is of high relative permittivity or dielectric constant ($\mu$), e.g., where water ($\mu = 81$), ethylene glycol ($\mu = 37.7$), or methyl alcohol ($\mu = 33.2$) is to be handled, the permeating liquid can cause a relatively large change in the characteristic impedance and, therefore, a serving 3 of jute will give adequate reflected waves. For the leak detection of a fluid of low relative permittivity, such as petroleum ($\mu = 2$ to $3$), it is necessary to use a serving of the lowest $\mu$ value, or close to that of air ($\mu = 1$), for example. This can be realized by using as little serving material as possible, for instance, by fitting disks of polyethylene or the like at regular intervals on the inner conductor 1 or by coiling a ribbon of such a material helically and spacially on the inner conductor to form a coaxial cable with interstices therein. However, the cable simply formed with the interstices in the manner described is not of practical use because of insufficient mechanical strength and the possibility of water gaining entrance into the spaces, with its high relative permittivity, unfavorably affecting the characteristic impedance of the cable. This problem is solved, in accordance with the present invention, by the use of a porous permeable film of plastics of an open-cell structure as the electric insulation 2 which is highly water-repellent and permeable to petroleum only. The insulation 2 made in this way may also function as the serving 3. The open-cell, porous permeable film may be made of PTFE (Teflon) having an average pore size of 0.5 – 5.0 microns and a porosity of 85 – 95%. Accordingly, the surface tension of water is stronger than that of petroleum, so that the water can be stopped without passing through the permeable film and the petroleum can penetrate through said film. The film has a relative permittivity close to that of air ($\mu = 1$), and hence the fluid-leak detector cable incorporating the film as a combination of the insulation 2 and the serving 3 is highly permeable to petroleum and is water-resistant, and its relative permittivity is distinctly variable from $\mu = 1$ to $\mu = 2 - 3$. Consequently, when the fluid-leak detector cable of the construction described is permeated with petroleum, an electric pulse transmitted from the monitor 12 of the pulse reflection type connected to one end of the cable will make it possible for the operator to observe a distinctive display of the reflected wave. Furthermore, the electrical pulse transmitted is reflected and, as a result, the arriving pulse is changed which can be observed at the other end of the cable.

EXAMPLE 1

A coaxial cable of the construction illustrated in FIG. 1 was made, using a 2.6-mm-dia. inner conductor 1 and a 5-mm-dia. outer conductor 4, the spacing between the two conductors being approximately 1.2 mm. The space was filled with the porous permeable film of plastics already described instead of with an electric insulation 2 and a serving 3. The exterior of the outer conductor 4 was covered with the permeable film with a thickness of 1 mm to form a covering or jacket 5. The resulted cable of about 50 m in length was tested in lengths of 10 cm, and the test specimens thus obtained were dipped in different baths of methyl ethyl ketone (MEK), gasoline, kerosene, Grade A fuel oil, and water. Each specimen was connected to a pulse tester, and the time needed for the observation of the reflected wave of each pulse after its transmission was measured. The results were as tabulated below:

Table 1

| Test fluid | Time required |
| --- | --- |
| MEK | 10 sec. |
| Gasoline | 15 sec. |
| Kerosene | 40 sec. |
| Fuel oil, A | 3 min. |
| Water | Infinite |

EXAMPLE 2

Figure 8:
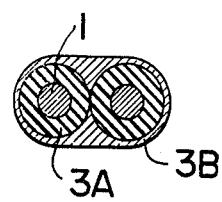
FIG. 8 is a transverse sectional view of a two-core arrangement embodying the present invention, with the outer conductors of the cables removed and the inner conductors arranged in parallel.

In this example the outer conductor 4 of the cable was replaced by a plurality of inner conductors 1, and electric pulses were transmitted between both conductors or changes in the characteristic impedance between the conductors were observed. In the cable construction shown in FIG. 8, each of the inner conductors 1, measuring 2.6 mm in diameter, was covered by a 1.2-mm-thick layer of the porous permeable film 3A. The two single-core cables thus formed were arranged side by side, and were covered together by a 0.1-mm-thick layer of the porous permeable film 3B. The combined cable of about 50 m in length was tested in lengths of 10 cm, dipped in MEK, gasoline, kerosene, Grade A fuel oil, or water. The two conductors of each test specimen were connected to a pulse tester, and the time required for the observation of a reflected wave of each pulse transmitted was measured. The results are table below:

Table 2

| Test fluid | Time required |
| --- | --- |
| MEK | 3 sec. |
| Gasoline | 5 sec. |
| Kerosene | 5 sec. |
| Fuel oil, A | 1 min. |

Table 2-continued

| Test fluid | Time required |
| --- | --- |
| Water | Infinite |

While the present invention has been illustrated by examples dealing mainly with the leak detection of petroleum and petroleum products, it should be obvious to those skilled in the art that the invention is also applicable to the leak detection of other fluids provided that they can cause changes in the inter-conductor electrostatic capacity and hence in the characteristic impedance of the detector cable according to the invention.

What is claimed is:

1. A fluid-leak detector cable which comprises an inner conductor, an outer conductor, and a serving layer for retaining a leaked fluid disposed therebetween, said layers being coaxially disposed with respect to each other, said outer conductor being provided with an exterior layer of a porous, permeable, plastic film which is permeable to hydrocarbons but not permeable to water, said film having an open-cell structure which is not soluble in the leaking fluid, thereby being adapted to retain the leaking fluid within the serving layer.

2. The fluid-leak detector cable of claim 1, wherein the porous, permeable, plastic layer is polytetrafluoroethylene which is made into a continuous, porous, permeable film of an open-cell structure having an average pore diameter of 0.5 to 5.0 microns.

3. The fluid-leak detector cable of claim 2, wherein the open-cell structure has a porosity of 85 to 95%.

4. The fluid-leak detector cable of claim 1, wherein the porous, permeable, plastic film is highly water repellant and permeable to only petroleum.

5. The fluid-leak detector cable of claim 1, wherein the serving layer is a continuous layer of jute.

6. The fluid-leak detector cable of claim 1, wherein the serving layer comprises a continuous porous, permeable, plastic film having an open-cell structure which is not soluble in the leaking fluid.

7. The fluid-leak detector cable of claim 6, wherein the serving layer is a continuous, porous, permeable film of polytetrafluoroethylene having an average pore diameter of 0.5 to 5.0 microns and a porosity of 85 to 95%.

8. The fluid-leak detector cable of claim 1, wherein a continuous insulating layer is disposed between the inner conductor and the serving layer.

9. A fluid-leak detector cable which comprises two conductors disposed substantially parallel to each other, each of said conductors being individually provided with a serving layer disposed therearound and each of said conductors and their corresponding serving layers being provided with a common covering layer, said serving layers and said covering layer being made of a porous, permeable plastic film which is permeable to hydrocarbons but not permeable to water, said film having an open-cell structure which is not soluble in the leaking fluid.

10. A method for detecting a hydrocarbon leak from an underground pipeline which comprises laying a fluid-leak detector cable in close proximity to and substantially parallel to the underground pipeline so that any leaking hydrocarbon fluid may permeate the fluid-leak detector cable, said fluid-leak detector cable comprising an inner conductor and an outer conductor, and a serving layer for retaining the leaked fluid disposed therebetween, said layers being coaxially disposed with respect to each other, said outer conductor being provided with an exterior layer of a porous, permeable, plastic film which is permeable to hydrocarbons, but not permeable to water, said film having an open-cell structure which is not soluble in the leaking fluid, thereby being adapted to retain the leaking fluid within the serving layer.

11. The method of detecting a hydrocarbon leak from an underground pipeline as defined in claim 10, wherein an electrical pulse is transmitted from one end of the fluid-leak detector cable and the reflected wave of the pulse at the starting end is observed to determine whether or not a leak has occurred.

12. The method of detecting a hydrocarbon leak from an underground pipeline as defined in claim 10, wherein an electrical pulse is transmitted from one end of the fluid-leak detector cable and the arriving wave of the pulse at the opposite end of said cable is observed to determine whether or not a leak has occurred.

* * * * *